United States Patent
Claessens et al.

(10) Patent No.: US 10,975,215 B2
(45) Date of Patent: Apr. 13, 2021

(54) PROCESS MAKING POLYMER POLYOL HAVING MONODISPERSE DISPERSED POLYMER PARTICLES

(71) Applicant: Dow Global Technologies LLC, Midland, MI (US)

(72) Inventors: Sven Claessens, Lokeren (BE); Antoon De Smet, Oostburg (NL); Gerard Pel, Bergen op Zoom (NL); Dale Hunter, Lake Jackson, TX (US); Van Delk, Jr., Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 205 days.

(21) Appl. No.: 16/088,573

(22) PCT Filed: Mar. 21, 2017

(86) PCT No.: PCT/US2017/023464
§ 371 (c)(1),
(2) Date: Sep. 26, 2018

(87) PCT Pub. No.: WO2017/172417
PCT Pub. Date: Oct. 5, 2017

(65) Prior Publication Data
US 2020/0299479 A1    Sep. 24, 2020

Related U.S. Application Data

(60) Provisional application No. 62/316,293, filed on Mar. 31, 2016.

(51) Int. Cl.
| | |
|---|---|
| *C08J 9/12* | (2006.01) |
| *C08G 18/08* | (2006.01) |
| *C08G 18/48* | (2006.01) |
| *C08G 18/76* | (2006.01) |
| *C08G 101/00* | (2006.01) |

(52) U.S. Cl.
CPC .......... *C08J 9/125* (2013.01); *C08G 18/0876* (2013.01); *C08G 18/485* (2013.01); *C08G 18/4829* (2013.01); *C08G 18/7671* (2013.01); *C08G 2101/0008* (2013.01); *C08J 2203/10* (2013.01); *C08J 2205/06* (2013.01); *C08J 2375/08* (2013.01)

(58) Field of Classification Search
CPC .... C08J 9/125; C08J 2203/10; C08J 2205/06; C08J 2375/08; C08G 18/0876; C08G 18/4829; C08G 18/485; C08G 18/7671; C08G 2101/0008
See application file for complete search history.

(56) References Cited

U.S. PATENT DOCUMENTS

| | | | |
|---|---|---|---|
| 4,148,840 A | 4/1979 | Shah | |
| 4,931,483 A | 6/1990 | Matsuoka | |
| 8,106,121 B2 | 1/2012 | Zaschke | |
| 9,193,821 B2 | 11/2015 | Lutter | |
| 2003/0220410 A1* | 11/2003 | Heinis | C08G 18/633 521/134 |
| 2009/0018227 A1* | 1/2009 | Nakada | C08G 18/0876 521/149 |
| 2012/0115970 A1* | 5/2012 | Lutter | C08G 18/48 521/170 |
| 2012/0184707 A1 | 7/2012 | Buijs | |
| 2013/0131205 A1 | 5/2013 | Fennis | |
| 2014/0051779 A1* | 2/2014 | Casati | C08G 18/0876 521/167 |
| 2014/0275471 A1* | 9/2014 | Adkins | C08G 65/2663 528/361 |

FOREIGN PATENT DOCUMENTS

| | | |
|---|---|---|
| EP | 510533 A | 10/1992 |
| EP | 698628 A | 2/1996 |
| EP | 0857182 A | 8/1998 |
| EP | 1506245 A | 11/2009 |
| WO | 2003/097712 A | 11/2003 |

\* cited by examiner

*Primary Examiner* — John M Cooney

(57) ABSTRACT

Polymer polyols are made in a seeded process, in which styrene and acrylonitrile are polymerized in the presence of a base polyol, a seed dispersion and a solvent. The seed dispersion contains an unsaturated macromer. The process produces a polymer polyol in which the dispersed phase particles have a particle size of 1 to 3 µm and a particle size span of less than 1.25. The polymer polyols are very useful for making flexible polyurethane foam for cushioning applications, in which high airflows and good load bearing are needed.

12 Claims, No Drawings

PROCESS MAKING POLYMER POLYOL HAVING MONODISPERSE DISPERSED POLYMER PARTICLES

This invention relates to methods for making dispersions of polymer particles in a polyol.

"Polymer polyols" (sometimes known as "copolymer polyols") are widely used raw materials for manufacturing flexible polyurethane foam and other polyurethane products. They have a continuous phase made up of one or more compounds having multiple hydroxyl groups (i.e., a "polyol") into which another polymer is dispersed in the form of small particles.

Polymer polyols have two main effects on the properties of flexible polyurethane foam. The dispersed polymer particles help to form open cells, increasing "airflow". In some applications such as seating and bedding, one often wants air to flow easily out of the foam when the foam is compressed (such as under the weight of a person) and to re-enter the foam easily when the compressive force is released (i.e., a person leaves the seat or bed). The other main reason to incorporate polymer polyols into a polyurethane foam is to increase "load-bearing" in resilient foams, i.e. the ability of the foam to support a compressive load. The combination of good airflow and high compressive strength results in a foam that feels soft and cushion-like, but is nonetheless able to support the weight of a person or persons.

The particle size of the dispersed polymer particles is important to achieving the intended effects. Very small particles increase load bearing, but do not open cells very efficiently. Very large particles achieve the opposite effect—airflow can be very high, but they can cause the foam to be brittle and have poor fatigue properties.

It has been suggested to produce a polymer polyol product that has a wide or polymodal particle size distribution, in an attempt to obtain the benefits of both large and small particles in resilient foams. Unfortunately, this approach instead tends to lead to inadequate airflow and load-bearing. Furthermore, in so-called viscoelastic foams, increasing load-bearing is not wanted, as it detracts from the perceived comfort and feel of the foam. Highly monodisperse polymer particles having diameters of approximately the foam cell wall thickness have been found to provide good airflow, without producing a brittle foam or a foam that has poor fatigue properties, and in the case of viscoelastic foam, without significant effect on load-bearing.

Polymer polyols are most commonly manufactured by polymerizing the disperse phase polymer directly within the continuous polyol phase ("in situ" polymerization). In such a process, monomers are dispersed as droplets in a continuous phase that includes the polyol. The dispersed droplets are subjected to polymerization conditions to produce polymer particles dispersed in the polyol.

To produce a stable dispersion in which the dispersed polymer particles remain suspended for long periods, it is necessary to employ one or more stabilization measures. These generally involve various strategies for grafting the particles to the continuous polyol phase or to a stabilizer molecule that is soluble in the continuous polyol phase. To this end, most commercial polymer polyol products include acrylonitrile copolymers as the dispersed polymer phase, because acrylonitrile grafts readily to polyols and produces a more stable dispersion.

It is also known to use a "seed" dispersion when manufacturing polymer polyols. The seed dispersion contains previously-formed polymer particles, and may be, for example, a "reactor heel" (i.e., a small amount of material left over from a previous production batch), or a specially made product. Additional monomers are polymerized in the presence of the seed dispersion and more of the carrier polyol.

Under some process conditions, the seed dispersion appears to function as a stabilizer. An example of this is the process described in U.S. Pat. No. 4,148,840. In this process the particle size of the seed particles appears to be approximately the same as that of the particles in the final product. This suggests that the added monomers nucleate new particles in this process, rather than migrating to the seed particles and growing them.

In other cases, the use of a seed particle leads to a product having a bimodal or polymodal particle size, as described, for example, in EP 698628A. The broad particle size distribution in this process again indicates that the added monomers are nucleating new particles instead of growing the seed particles.

Under different process conditions, such as those described in EP 510533A and EP 786480A, added monomers migrate to the seed particles and grow them, and little if any nucleation of new particles occurs. In an example, EP 510533 describes using a process in which about 0.15 weight-percent of 90 nm seed particles are added into the process, to form a dispersion that contains 25 weight-percent of 490-510 nm styrene/acrylonitrile (75/25 by weight) copolymer particles. The final particles have volumes about 167 times those of the seed particles.

The process of EP 786480 is restricted to forming particles with 80% or more styrene and 20% (and preferably much less) acrylonitrile. 250 nm seed particles are grown to diameters of at most about 1 μm, and while a higher solids dispersion is obtained than in EP 510533, volume growth is only to about 50 times that of the seed particles. Therefore, a rather large amount of seed dispersion is needed to obtain a high solids polymer polyol product. This adds significant expense, as large quantities of the seed dispersion must be manufactured, stored and handled. Furthermore, the seed dispersion contains very high concentrations of expensive stabilizer, which like the seed dispersion itself is a separately manufactured product that must be made, stored and handled. The EP 786480 process is additionally limited to making very high styrene content disperse phase particles. This detracts from dispersion stability, as the high styrene polymer particles tend to graft inadequately to the continuous polyol phase, and therefore tend to settle.

What is desired is a process for making a dispersion of styrene/acrylonitrile copolymer particles in a continuous polyol phase. The process should produce dispersed copolymer particles that have small, controllable diameters and which have a narrow particle size distribution. The process moreover should use small amounts of seed dispersion and stabilizers, yet produce a stable dispersion with a high solids content.

This invention is a process for making a polymer polyol that contains styrene/acrylonitrile copolymer particles dispersed in a continuous phase that includes at least one polyol, comprising the steps of a) forming a seed dispersion containing 5 to 25 weight-% of an unsaturated macromer, 2.5-20 weight-% of styrene polymer or copolymer particles having a particle size of 50 to 500 nm, and 55-92.5 weight-% of a seed dispersion carrier polyol, the weight-percentages being based on the weight of the seed dispersion;

b) forming a carrier mixture containing the seed dispersion, a base polyol and a solvent, and dispersing a monomer mixture that includes at least 25 weight-% styrene and greater than 20 weight-% acrylonitrile, based on the weight of the monomer mixture, into the carrier mixture, wherein i) the amount of seed dispersion is sufficient to provide 0.025 to 0.35 weight percent seed particles and 0.1 to 0.75 weight percent of unsaturated macromer based on the combined weight of the carrier mixture and monomer mixture;

ii) the weight of the monomer mixture is at least 200 times the weight of the seed particles and when polymerized is sufficient to provide the polymer polyol with at least 30 weight-percent dispersed polymer particles and iii) the amount of the solvent is 6 to 20% of the combined weight of the carrier mixture and the monomer mixture;

c) polymerizing the dispersed monomer mixture to form polymer particles dispersed in the carrier mixture and then d) removing the solvent from the carrier mixture to form a polymer polyol product containing at least 30 weight-percent dispersed polymer particles, wherein the dispersed polymer particles have a particle size of 1 to 3 μm and a particle size span of less than 1.25.

This process produces high solids, stable dispersions in which the particles have narrow particle size distributions and particle diameters that closely approximate the thickness of cell windows of flexible polyurethane foams. When used to make polyurethane foams, the dispersions provide excellent airflow and load-bearing characteristics to the foam.

The seed dispersion contains 5 to 25 weight-% of an unsaturated macromer, 2.5-20 weight-% of particles of a styrene polymer or copolymer, which particles have a particle size of 50 to 200 nm, and 55-92.5 weight-% of a seed dispersion carrier polyol, the weight-percentages being based on the weight of the seed dispersion.

The unsaturated macromer is a compound characterized in (i) being soluble in the seed dispersion carrier polyol in the relative proportions present in the seed dispersion, (ii) having a number average molecular weight of 6,000 to 25,000, (iii) containing at least one polymerizable carbon-carbon double or triple bond and (iv) having at least one hydroxyl group.

The number average molecular weight of the macromer is preferably 8,000 to 15,000 and more preferably 11,000 to 14,000. Macromer molecular weights can be determined using gel permeation chromatography methods.

For purposes of this invention, a carbon-carbon double or triple bond is "polymerizable", if it can polymerize with carbon-carbon double or triple bonds of other molecules (including styrene and/or acrylonitrile) to form a copolymer. The polymerizable unsaturated group preferably is a carbon-carbon double bond and more preferably is $CH_2=CH-$ or $CH_2=C(CH_3)-$. The macromer preferably has an average of 1 to 2, more preferably 1 to 1.5, polymerizable carbon-carbon double or triple bonds per molecule.

The macromer in some embodiments contains 3 to 8 hydroxyl groups per molecule, preferably 4 to 7 hydroxyl groups per molecule and still more preferably 4 to 5 hydroxyl groups per molecule.

The macromer in some cases is a polyether. Such a polyether may be, for example, a homopolymer of propylene oxide, a homopolymer of ethylene oxide, or a copolymer (random and/or block) of propylene oxide and ethylene oxide. The macromer may be, for example, a random copolymer of 80 to 95% by weight propylene oxide and 5 to 20% ethylene oxide, based on the combined weight of the propylene oxide and ethylene oxide. For purposes of this invention, a copolymer of propylene oxide and ethylene oxide is considered to be "random" if the propylene oxide and ethylene oxide are provided to the polymerization and polymerized simultaneously. The macromer preferably is a polymer of a mixture of 84 to 90% by weight propylene oxide and 10 to 16% by weight ethylene oxide.

In specific embodiments, the macromer is a random copolymer of a mixture of 84 to 90% by weight propylene oxide and 10 to 16% by weight ethylene oxide, having a number average molecular weight of 8,000 to 15,000 and more preferably 11,000 to 14,000, and which contains 4 to 6 hydroxyl groups per molecule and 1 to 1.5 polymerizable unsaturated groups per molecule. In other specific embodiments, the macromer is a random copolymer of a mixture of 85 to 90% by weight propylene oxide and 10 to 15% by weight ethylene oxide, having a number average molecular weight from 10,000 to 15,000, and which contains 4 to 5 hydroxyl groups per molecule and 1 to 1.5 polymerizable unsaturated groups per molecule. Such macromers are described in WO 2014/055282.

In one method for forming the macromer, a polyether having about 3 to 8 hydroxyl groups and a number average molecular weight of about 5,950 to 24,950, is "capped" at one or more of the hydroxyl groups by reaction with a capping agent having polymerizable unsaturation. The capping agent and the starting polyether preferably are reacted in a ratio of about 0.05 to about 1.0 mole, preferably from 0.25 to 0.9 mole, more preferably from 0.4 to 0.8 mole, of capping agent per mole of starting polyether. Using a stoichiometric excess of the starting polyether in the capping reaction helps to minimize the proportion of molecules that become capped with two or more of the capping groups. The capping reaction is preferably performed under conditions that promote even distribution of the capping agent, such as, for example, by adding the capping agent to the polyether, agitating the reactants as they are mixed, and the like. The result of this capping reaction is in some cases a mixture of the macromer and an unreacted portion of the polyether.

The capping agent includes, in addition to the polymerizable unsaturation, a functional group that can react with a hydroxyl group of the polyether (or a corresponding alkoxide ion) to form a covalent bond to the polyether. The capping agent may be, for example, an ethylenically unsaturated isocyanate compound such as 3-isopropenyl-α,α-dimethylbenzylisocyanate (TMI) or isocyanatoethylmethacrylate (IEM), an ethylenically unsaturated halide such as vinyl benzyl chloride, and ethylenically unsaturated siloxane such as vinyltrimethoxylsilane, or an ethylenically unsaturated epoxide compound.

TMI and IEM are highly preferred capping agents. In especially preferred embodiments, the macromer is a random copolymer of 85 to 90% by weight propylene oxide and 10 to 15% by weight ethylene oxide having a molecular weight from 10,000 to 15,000, capped with TMI and/or IEM. This especially preferred macromer preferably is capped with 0.4 to 0.8 TMI and/or IEM groups/molecule and has, after capping, 4 to 6, especially 4 to 5, hydroxyl groups per molecule.

An alternative route to making the macromer is to alkoxylate a compound that contains a polymerizable carbon-carbon double or triple bond and one or more oxyalkylatable groups. Examples of such ethylenically unsaturated compounds include ethylenically unsaturated alcohols, thiols or amines. Synthetic routes of this type are described, for example, in U.S. Pat. No. 5,854,396 and in EP 1 675 885 B1. A branching agent such as glycidol may be included in the alkoxylation reaction, generally by introducing the branching agent early in the alkoxylation reaction and then continuing the alkoxylation reaction without adding more of the branching agent.

In the seed dispersion, some or all of the macromer may be present in polymerized form, due to, for example, copolymerization with the monomers the form the seed particles. The amount of macromer in the seed dispersion may be 5 to 20 weight-%, 5 to 18 weight-%, 8 to 15 weight-% or 10 to 15 weight-%, based on the total weight of the seed dispersion.

The seed dispersion contains 2.5-20 weight-% of particles of a styrene polymer or copolymer. In specific embodiments, it contains 5 to 20, 5 to 15 or 5 to 12 or 5 to 10 weight-percent of such particles. The styrene polymer is a homopolymer of styrene or copolymer of styrene and one or more copolymerizable monomers as described more fully below. The styrene polymer may contain, for example, 25 to 100%, 40 to 100%, 50 to 90%, 50 to 80% or 60 to 80% by weight polymerized styrene (ignoring the weight of any of the unsaturated macromer which may become copolymerized into the particles). A preferred styrene polymer is a copolymer of 50 to 80 weight-%, especially 60 to 80 weight-% styrene and 20 to 50 weight-%, especially 20 to 40 weight-%, acrylonitrile.

For purposes of this invention, the weight of the styrene polymer or copolymer particles is considered as the weight of the monomers that are polymerized to make the seed dispersion (but not including the macromer), less the weight of any monomers that are not converted to polymer (again excluding the macromer).

The particles in the seed dispersion have a particle size of 50 to 500 nm. In specific embodiments, the particle size of the seed particles may be 50 to 400 nm, 75 to 250 nm, 75 to 125 nm or 90 to 125 nm.

The seed dispersion also contains a seed dispersion carrier polyol. The seed dispersion carrier polyol is generally as described below with respect to the base polyol used to make the final polymer polyol component. The seed dispersion carrier polyol should be soluble in the base polyol at the relative proportions thereof present in the final polymer polyol component. It is preferred that the seed dispersion carrier polyol is the same as the base polyol.

The seed dispersion carrier polyol may constitute, for example, 50 to 92.5 weight-%, 50 to 90 weight-%, 50 to 80 weight-%, 60 to 80 weight-% or 60 to 70 weight-% of the seed dispersion.

In addition to the foregoing ingredients, the seed dispersion may contain, for example, up to 5 weight-%, preferably up to 4 weight-%, of unreacted monomers and/or up to 20 weight-%, preferably 5 to 20 weight-% and more preferably 8 to 15 weight-%, of a solvent as described below.

The seed dispersion is conveniently prepared by the in situ polymerization of styrene or a mixture of styrene with one or copolymerizable monomers in the presence of the macromer, the seed dispersion carrier polyol, and (if any) the solvent. The in situ polymerization is conveniently performed by dispersing the monomers into a mixture of the macromer and seed dispersion carrier polyol to form monomer droplets, and then subjecting the dispersion to polymerization conditions such as are described below. The polymerization step is generally performed under agitation to size the droplets and minimize their agglomeration until such time as solid styrene polymer or copolymer particles form. The polymerization preferably is continued until the dispersion contains at least 2.5 weight-% styrene polymer or copolymer particles. It is further preferred to continue the polymerization until the conversion of monomers is at least 60% by weight.

The polymerization to form the seed dispersion can be performed batch-wise or continuously. General conditions for performing the polymerization are as described below with respect to the production of the final polymer polyol product.

It is generally unnecessary to remove unreacted monomers, solvent or other volatiles from the seed dispersion before using it to make the polymer polyol product.

The polymer polyol is prepared by dispersing a monomer mixture that includes styrene and acrylonitrile into a carrier mixture that contains the seed dispersion, a base polyol and a solvent. The dispersed monomer mixture is then polymerized, and the solvent is thereafter stripped from the carrier mixture to obtain the polymer polyol product.

The monomer mixture contains at least 25 weight-% styrene and greater than 20 weight-% acrylonitrile, based on the total weight of monomers in the monomer mixture. The monomer mixture may contain, for example, at least 40 weight-%, at least 50 weight-%, at least 60 weight-% or at least 70 weight-% styrene, and may contain, for example, 20 to 50 weight-%, 20 to 40 weight-% acrylonitrile or 20 to 30 weight-% acrylonitrile.

In addition to styrene and acrylonitrile, the monomer mixture may contain one or more other ethylenically unsaturated monomers that have a molecular weight of up to 150. Examples of such monomers include for example, aliphatic conjugated dienes such as butadiene and isoprene; monovinylidene aromatic monomers such as, $\alpha$-methyl styrene, t-butyl styrene, chlorostyrene, cyanostyrene and bromostyrene; $\alpha,\beta$-unsaturated carboxylic acids, and esters or anhydrides thereof such as acrylic acid, methacrylic acid, methyl methacrylate, ethyl acrylate, 2-hydroxyethyl acrylate, butyl acrylate, itaconic acid, maleic anhydride and the like; $\alpha,\beta$-unsaturated nitriles and amides such as acrylonitrile, methacrylonitrile, acrylamide, methacrylamide, N,N-dimethyl acrylamide, N-(dimethylaminomethyl) acrylamide and the like; vinyl esters such as vinyl acetate, vinyl ethers, vinyl ketones, vinyl and vinylidene halides, and the like.

The amount of monomer mixture used to make the polymer polyol is at least 200 times the weight of the seed particles and in addition is an amount sufficient to provide the polymer polyol with at least 30 weight-percent dispersed polymer particles, based on the weight of the product after the stripping step. The weight of the monomer mixture includes the weight of any residual monomers that are contained in the seed dispersion. The weight of dispersed polymer particles in the product is the combined weight of seed particles, any residual monomers in the seed dispersion and the monomer mixture, less the weight of any residual monomers in the product. The weight of the macromer is not included in the calculation of the weight of the dispersed polymer particles.

In specific embodiments, the weight of monomer mixture may be, for example 200 to 1600 times, 200 to 1000 times, 200 to 750 times or 200 to 500 times the weight of the seed particles, and may be an amount sufficient to provide the polymer polyol with 30 to 60, 35 to 60, 35 to 55 or 38 to 50% by weight dispersed polymer particles.

The amount of the seed dispersion is sufficient to provide 0.025 to 0.35 weight percent seed particles and 0.1 to 0.75 weight percent of unsaturated macromer based on the combined weight of the carrier mixture and monomer mixture. In some embodiments, the amount of seed dispersion is sufficient to provide 0.05 to 0.3 weight-%, 0.1 to 0.3 weight-%, 0.1 to 0.25 weight-% or 0.125 to 0.20 weight-% seed particles. In some embodiments, the amount of seed dispersion is sufficient to provide 0.1 to 0.5 weight-%, 0.15 to 0.5 weight-%, 0.2 to 0.4 weight-% or 0.25 to 0.4 weight-% unsaturated macromer.

The base polyol is an organic material having isocyanate-reactive groups, or a mixture of such organic materials. The base polyol is a liquid at room temperature (22° C.) and contains an average of at least 1.8 isocyanate-reactive groups per molecule. The base polyol should have a boiling temperature of at least 250° C. The term "polyol" is used herein as a shorthand term for such materials, even though the actual isocyanate-reactive groups in a particular case may not necessarily be hydroxyl groups. The liquid polyol preferably contains an average of 1.8 to 8 isocyanate-reactive groups/molecule, especially from 2 to 4 such groups. The isocyanate-reactive groups are preferably aliphatic hydroxyl, aromatic hydroxyl, primary amino and/or secondary amino groups. Hydroxyl groups are preferred. Hydroxyl groups are preferably primary or secondary hydroxyl groups.

The equivalent weight of the base polyol per isocyanate-reactive group will depend on the intended application for the polyurethane. Base polyols having an equivalent weight of 400 or greater, such as from 400 to 3000, are preferred for forming elastomeric polyurethanes such as slabstock or molded polyurethane foams, microcellular polyurethane elastomers and non-cellular polyurethane elastomers. Lower equivalent weight base polyols, such as those having an equivalent weight of 31 to 399, are preferred for making rigid polyurethane foams and structural polyurethanes.

Preferred types of base polyol(s) include polyether polyols, polyester polyols, and various types of polyols that are prepared from vegetable oils or animal fats.

Polyether polyols include, for example, polymers of propylene oxide, ethylene oxide, 1,2-butylene oxide, tetramethylene oxide, block and/or random copolymers thereof, and the like. Of particular interest are polypropylene oxide) homopolymers; random copolymers of propylene oxide and ethylene oxide in which the poly(ethylene oxide) content is, for example, from about 1 to about 30% by weight; ethylene oxide-capped polypropylene oxide) polymers; and ethylene oxide-capped random copolymers of propylene oxide and ethylene oxide. The polyether polyols may contain low levels of terminal unsaturation (for example, less that 0.02 meq/g or less than 0.01 meq/g). Examples of such low unsaturation polyether polyols include those made using so-called double metal cyanide (DMC) catalysts, as described for example in U.S. Pat. Nos. 3,278,457, 3,278,458, 3,278,459, 3,404,109, 3,427,256, 3,427,334, 3,427,335, 5,470,813 and 5,627,120.

Suitable polyester polyols include reaction products of polyols, preferably diols, with polycarboxylic acids or their anhydrides, preferably dicarboxylic acids or dicarboxylic acid anhydrides. Other suitable polyesters include polymers of cyclic lactones such as polycaprolactone.

Suitable base polyols prepared from vegetable oils and animal fats include, for example, hydroxymethyl group-containing polyols as described in WO 04/096882 and WO 04/096883; castor oil, so-called "blown" vegetable oils, and polyols prepared by reacting a vegetable oil with an alkanolamine (such as triethanolamine) to form a mixture of monoglycerides, diglycerides, and reaction products of the fatty acid amides, which are ethoxylated to increase reactivity and to provide a somewhat more hydrophilic character. Materials of the last type are described, for example in GB1248919.

Suitable low equivalent weight polyols include materials containing 2 to 8, especially 2 to 6 hydroxyl, primary amine or secondary amine groups per molecule and having an equivalent weight of 30 to about 200, especially 50 to 125. Examples of such materials include diethanol amine, mono- ethanol amine, triethanol amine, mono- di- or tri(isopropanol) amine, glycerin, trimethylol propane, pentaerythritol, sorbitol, ethylene glycol, diethylene glycol, 1,2-propylene glycol, dipropylene glycol, tripropylene glycol, ethylene diamine, phenylene diamine, bis(3-chloro-4-aminophenyl) methane and 2,4-diamino-3,5-diethyl toluene.

Preferred base polyols are polyethers having a hydroxyl equivalent weight of 400 to 2500, especially 400 to 2000, especially propylene oxide homopolymer and copolymers (random and/or block) of at least 70 weight-% propylene oxide and up to 30 weight-% ethylene oxide.

The solvent is one or more low molecular weight compounds having a boiling temperature of 50 to 180° C., preferably 50 to 125° C. and more preferably 60 to 100° C. at one atmosphere pressure, which are soluble in the base polyol at the relative proportions that are present, and which are solvents for the monomer mixture. The solvent should not dissolve the seed particles or the dispersed styrene-acrylonitrile particles formed in the process. Suitable such solvents include aromatic hydrocarbons such as toluene or xylene, aliphatic hydrocarbons such as hexane, monoalcohols such as ethanol, isopropanol, 1-butanol, 2-butanol, t-butanol, 1-pentanol, 1-hexanol.

The amount of the solvent (including any included with the seed dispersion) is 6 to 20%, preferably 6 to 16% and more preferably 6 to 12% of the combined weight of the carrier mixture and the monomer mixture.

The dispersed monomer mixture is polymerized to form polymer particles dispersed in the carrier mixture. Suitable methods and conditions for performing such in situ polymerizations includes those described, for example, in U.S. Pat. Nos. 4,513,124, 4,588,830, 4,640,935, 5,854,386, 4,745,153, 5,081,180, 6,613,827 and EP 1 675 885.

The polymerization or copolymerization of the monomer mixture may be a free-radical polymerization, performed in the presence of a free radical initiator that generates free radicals under the conditions of the polymerization process. Examples of suitable free-radical initiators include, for example, peroxy compounds such as peroxides, persulfates, perborates, percarbonates, azo compounds and the like. Specific examples include hydrogen peroxide, di(decanoyl) peroxide, dilauroyl peroxide, t-butyl perneodecanoate, 1,1-dimethyl-3-hydroxybutyl peroxide-2-ethyl hexanoate, di(t-butyl)peroxide, t-butylperoxydiethyl acetate, t-butyl peroctoate, t-butyl peroxy isobutyrate, t-butyl peroxy-3,5,5-trimethyl hexanoate, t-butyl perbenzoate, t-butyl peroxy pivulate, t-amyl peroxy pivalate, t-butyl peroxy-2-ethyl hexanoate, t-amyl peroxy-2-ethyl hexanoate, lauroyl peroxide, cumene hydroperoxide, t-butyl hydroperoxide, azo bis (isobutyronitrile), 2,2'-azo bis(2-methylbutyronitrile) and the like. Two or more of the foregoing may be used. The amount of free radical initiator may range, for example, from 0.01 to 5%, preferably 0.0.1 to 3% by weight, based on the weight of the monomer mixture.

The polymerization may a "controlled radical polymerization", by which is meant a living free-radical polymerization process characterized in that a dynamic equilibrium between propagating radicals and dormant species is established, allowing radicals to become reversibly trapped. Various types of controlled radical polymerizations are known including, for example, cobalt-mediated radical polymerization (CMPR), stable free radical mediated polymerization (SFRMP) (including, for example, a nitroxide-mediated polymerization (NMP)), atom transfer radical polymerization (ATRP) and reversible addition fragmentation chain transfer (RAFT).

The polymerization typically is performed at an elevated temperature, typically from 80 to 200° C., more typically 100 to 140° C., still more typically from 110 to 130° C. The polymerization temperature may be selected in conjunction with the selection of the polymerization initiator, so the polymerization initiator decomposes to produce free radicals at the polymerization temperature.

Pressures are sufficient to prevent the solvent from volatilizing until the polymerization of the monomer mixture to form styrene/acrylonitrile copolymer particles has taken place.

A molecular weight regulator such as a chain transfer agent is another useful ingredient. Examples of these include certain tertiary amines such as triethylamine and mercaptans such as dodecylmercaptan and octadecylmercaptan. These materials are typically present (if used at all) in amounts ranging from 0.1 to 5%, preferably 0.25 to 1.2%, based on the weight of the monomer mixture.

Additional amounts of the unsaturated macromer and/or other stabilizers such as one or more surfactants may be present during the production of the polymer polyol, but it has been found, unexpectedly, that very good results are obtained even when the only stabilizer present during the polymerization is the unsaturated macromer that is introduced into the process with the seed dispersion. Therefore, it is preferred to form the polymer polyol in the absence of additional unsaturated macromer and/or other stabilizer, or to include in the polymer polyol production step at most only small amounts of unsaturated macromer and/or other stabilizer(s), in addition to the unsaturated macromer that is introduced with the seed dispersion. Any such additional unsaturated macromer or other may constitute, for example, up to 5%, up to 2%, or up to 1% of the combined weight of the carrier mixture and monomer mixture.

The polymerization typically is performed under agitation, to keep the monomer mixture dispersed in the form of small droplets in the polyol phase until they have polymerized to form solid particles. The polymerization is continued until solid polymer particles are formed and preferably until at least 90%, more preferably at least 95%, by weight of the monomers have become converted to polymer.

The polymerization can be performed continuously or in various batch and semi-batch processes. A continuous process is characterized by the continuous introduction of the various ingredients into the polymerization, and continuous withdrawal of product. In a semi-batch process, at least a portion of the monomer mixture is continuously or intermittently introduced into the polymerization, but product is not continuously withdrawn, preferably not being removed until the polymerization is completed. In the semi-batch process, some or all of the polyol(s) and/or seed dispersion may be added continuously or intermittently during the process, but the entire amounts of those materials may instead be charged to the polymerization apparatus prior to the start of the polymerization. In a batch process, all ingredients are charged at the beginning of the polymerization, and product is not removed until the polymerization is completed.

After the polymerization is completed, the solvent is removed from the polymer polyol product. Other volatiles such as residual monomers and/or other low molecular weight materials may be removed as well. These materials can be removed, for example, by heating and/or subjecting the product to subatmospheric pressures and/or by stripping the product with steam or other gas.

The product polymer polyol, after removal of the solvent, contains at least 30% by weight of dispersed polymer particles. The polymer polyol may contain, for example, 30 to 60, 35 to 60, 35 to 55 or 38 to 50% by weight dispersed polymer particles.

The dispersed thermoplastic polymer particles have a particle size of 1 to 3 μm and a particle size span of less than 1.25, preferably less than 1.0 and more preferably less than 0.75. Particle sizes for purposes of this invention (including those of the particles in the seed dispersions) are "mode" particle sizes, which represents the peak of the particle size distribution, i.e., the particle size representing the largest volume fraction of particles). Particle size is conveniently measured according to ASTM D1921 using laser diffraction methods. A Beckman Coulter LS 13 320 laser diffraction particle size analyzer or equivalent apparatus is suitable for measuring particle size. The particle size span is calculated as $(D_{90}-D_{10})/D_{50}$, where $D_{90}$ is the 90% point of diameter, i.e. the diameter equal to or larger than 90 volume-% of the particles; $D_{10}$ is the 10% point of diameter (i.e., the diameter equal to or larger than 10 volume-% of the particles) and $D_{50}$ is the median diameter (the diameter equal to or larger than 50 volume-% of the particles).

The polymer polyol is useful to make a wide variety of polyurethane and/or polyurea products. The polyurethane and/or polyurea products will be in most instances elastomeric materials that may be non-cellular, microcellular or foamed. Polyurethanes are typically prepared by reacting the polymer polyol or dispersion with a polyisocyanate. The polymer polyol product may be blended with one or more additional polyols, including those types described above with respect to the base polyol, to adjust the solids content to a desired level or provide particular characteristics to the polyurethane. The reaction with the polyisocyanate is performed in the presence of a blowing agent or gas when a cellular product is desired. The reaction may be performed in a closed mold, but in some applications, such as slabstock foam, the reaction mixture is generally permitted to rise more or less freely to form a low density foam material. Generally, the polymer polyol of the invention can be used in the same manner as conventional polymer polyol materials to make polyurethanes, using the same general types of processes as are used with the conventional materials.

Suitable polyisocyanates include aromatic, cycloaliphatic and aliphatic isocyanate. Exemplary polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl) cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

The amount of polyisocyanate used in making a polyurethane is commonly expressed in terms of isocyanate index, i.e., 100 times the ratio of NCO groups to isocyanate-reactive groups in the reaction mixture (including those provided by water if used as a blowing agent). In general, the isocyanate index may range as low as 60 and as high as 500 or more. However, for the production of conventional slabstock foam, the isocyanate index typically ranges from about 95 to 140, especially from about 105 to 115. In molded and high resiliency slabstock foam, the isocyanate index typically ranges from about 50 to about 150, especially from about 85 to about 110.

A catalyst is often used to promote the polyurethane-forming reaction. The selection of a particular catalyst package may vary somewhat with the particular application, the particular polymer polyol or dispersion that is used, and the other ingredients in the formulation. The catalyst may catalyze the "gelling" reaction between the polyol(s) and the polyisocyanate and/or, in many polyurethane foam formulation(s), the water/polyisocyanate (blowing) reaction which generates urea linkages and free carbon dioxide to expand the foam. In making water-blown foams, it is typical to use a mixture of at least one catalyst that favors the blowing reaction and at least one other that favors the gelling reaction.

A wide variety of materials are known to catalyze polyurethane-forming reactions, including tertiary amines, tertiary phosphines, various metal chelates, acid metal salts, strong bases, various metal alcoholates and phenolates and metal salts of organic acids. Catalysts of most importance are tertiary amine catalysts and organotin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the high equivalent weight polyol.

When forming a foam, the reaction of the polyisocyanate and the polyol component is conducted in the presence of a blowing agent. Suitable blowing agents include physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful.

The invention provides particular benefits when used to make water-blown flexible polyurethane foam, i.e., when the blowing agent is water or a mixture of water and a physical blowing agent such as a fluorocarbon, hydrofluorocarbon, hydrochlorocarbon or hydrocarbon blowing agent. Water reacts with isocyanate groups to liberate carbon dioxide and form urea linkages. Typically, about 1 to about 7, especially from about 2.5 to about 5, parts by weight water are typically used per 100 parts by weight of polyols in the foam formulation.

Alternatively or in addition, a gas such as carbon dioxide, air, nitrogen or argon may be used as the blowing agent to produce polyurethane foam in a frothing process. Carbon dioxide can also be used as a liquid or as a supercritical fluid.

A surfactant is also used when a polyurethane foam is prepared. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

In addition to the foregoing components, the polyurethane formulation may contain various other optional ingredients such as cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In general, a polyurethane foam is prepared by mixing the polyisocyanate and polymer polyol in the presence of the blowing agent, surfactant, catalyst(s) and other optional ingredients as desired, under conditions such that the polyisocyanate and polyol react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the high equivalent weight polyol(s) to form a prepolymer, which is reacted in a second step with a chain extender and/or water to form the desired foam. Frothing methods (as described in U.S. Pat. Nos. 3,755,212; 3,849,156 and 3,821,130, for example), are also suitable. So-called one-shot methods (such as described in U.S. Pat. No. 2,866,744) are preferred. In such one-shot methods, the polyisocyanate and all polyisocyanate-reactive components are simultaneously brought together and caused to react. Three widely used one-shot methods which are suitable for use in this invention include slabstock flexible foam processes, high resiliency flexible slabstock foam processes, and molded flexible foam methods.

Polymer polyols made in accordance with the invention have been found to provide excellent cell-opening (as indicated by high airflows) and enhanced load-bearing to polyurethane foams made with the polymer polyols. Airflows may be, for example, at least 1.5 L/s or at least 2.0 L/s as measured according to ASTM D3574, and may be as high, for example as, 5 L/s. 65% indentation load deflection of the foam may be at least 1 kPa, and may be, for example, as high as 5 kPa, as measured according to AST D3574 with a circular 322 $cm^2$ indentation plate.

In addition, the foams tend to have good fatigue properties.

The following examples are provided to illustrate the invention, but are not intended to limit the scope thereof. All parts and percentages are by weight unless otherwise indicated.

EXAMPLES

Polyol A is a nominally trifunctional random copolymer of 90% propylene oxide and 10% ethylene oxide, having a molecular weight of 3000.

Polyol B is a 1000 molecular weight, nominally trifunctional random copolymer of propylene oxide and ethylene oxide.

Polyol C is a 1000 molecular weight, nominally trifunctional polymer of propylene oxide.

Polyol D is a 3100 molecular weight, nominally trifunctional random copolymer of propylene oxide and ethylene oxide.

The Macromer is a hexafunctional random copolymer of about 89% propylene oxide and 11% ethylene oxide reacted with about 0.55 moles of TMI per mole of copolymer. The Macromer molecules contain 1-2 polymerizable carbon-carbon double bond per molecule and 4-5 hydroxyl groups per molecule.

A. Preparation of Seed Dispersion A

Seed dispersion A is made in a continuous stirred tank reactor with a recirculation loop from the following starting materials:

TABLE 1

| Ingredient | Parts by Weight |
| --- | --- |
| Styrene | 7.38 |
| Acrylonitrile | 2.80 |
| Polyol A | 66.25 |
| Macromer | 12.10 |
| Free radical initiator | 0.12 |
| Isopropanol | 11.35 |

The polymerization is performed at a temperature of 115° C. under pressure sufficient to prevent the monomers and isopropanol from volatilizing, until about 70% of the monomers are converted to polymer. The resulting seed dispersion is then cooled to room temperature, maintaining sufficient pressure to prevent the isopropanol from volatilizing. The resulting seed dispersion contains about 11.35% isopropanol, 66.25% Polyol A, 7% of seed particles, 2.3% residual styrene and 0.9% residual acrylonitrile. The particle size is 100 nm.

B. Preparation of Seed Dispersion B

Seed dispersion B is made in a batch reactor from the following starting materials:

TABLE 2

| Ingredient | Parts by Weight |
| --- | --- |
| Styrene | 7.45 |
| Acrylonitrile | 2.83 |
| Polyol A | 66.20 |
| Macromer | 12.10 |
| Free radical initiator | 0.12 |
| Isopropanol | 11.30 |

56.74 parts of the polyol are blended with the macromer and isopropanol, charged to a reactor under a nitrogen atmosphere, and heated to 90° C. with stirring. The remaining ingredients are mixed separately. The reactor set point is increased to 110° C. and the remaining ingredients are fed into the reactor over 5 minutes, then allowed to polymerize at 110° C. for 45 minutes, under pressure to keep the isopropanol from volatilizing. The resulting seed dispersion is then cooled to room temperature, maintaining sufficient pressure to prevent the isopropanol from volatilizing. Conversion to monomer is about 70%. Seed Dispersion B contains 66.2% Polyol A, 11.3% isopropanol, 6.2% seed particles, 2.9% residual styrene and 1.0% residual acrylonitrile. The particle size is 110 nm.

C. Preparation of Polymer Polyols

Example 1

19.82 parts of Polyol A are mixed with 6.25 parts of isopropanol and 2.5 parts of Seed Dispersion A, charged to a batch reactor under nitrogen, and heated to 110° C. Separately, 26.5 parts of styrene, 34.34 parts of Polyol A, 10.05 parts of acrylonitrile, 0.24 parts of a free radical initiator and 0.3 parts of n-dodececyl mercaptan are mixed. This mixture is fed into the reactor over 180 minutes while maintaining a temperature of 110° C., a nitrogen atmosphere, stirring and sufficient pressure to keep the isopropanol from volatilizing. Polymerization is continued for 60 minutes after addition of the monomer stream is complete. The reactor is allowed to cool to 40° C., and isopropanol and other volatiles are removed under vacuum to yield a polymer polyol product having 39.4% solids. The particle size is 2.11 µm and the particle size span is 1.14. The viscosity per ASTM D4878 is 4830 mPa·s at 25° C. and 100 sec$^{-1}$. The overall recipe is as follows:

TABLE 3

| | Weight-% | | |
| --- | --- | --- | --- |
| Ingredient | From Seed Dispersion | From Remainder of Recipe | Total |
| Polyol A | 1.656 | 54.16 | 55.816 |
| Macromer | 0.303 | 0 | 0.303 |
| Seed Particles | 0.175 | 0 | 0.175 |
| Isopropanol | 0.284 | 6.25 | 6.534 |
| Styrene | 0.057 | 26.5 | 26.557 |
| Acrylonitrile | 0.023 | 10.05 | 10.073 |
| N-dodecylmercaptan | Negligible | 0.3 | 0.3 |
| Free Radical Initiator | Negligible | 0.120 | 0.120 |
| Ratio, Monomer Mixture/Seed Particles | | | 209 |

Example 2

19.93 parts of Polyol A are mixed with 6.25 parts of isopropanol and 2.5 parts of Seed Dispersion B, charged to a batch reactor under nitrogen, and heated to 110° C. Separately, 26.5 parts of styrene, 34.53 parts of Polyol A, 10.05 parts of acrylonitrile and 0.24 parts of a free radical initiator are mixed. This mixture is fed into the reactor over 180 minutes while maintaining a temperature of 110° C., a nitrogen atmosphere, stirring and sufficient pressure to keep the isopropanol from volatilizing. Polymerization is continued for 60 minutes at 115° C. after addition of the monomer stream is complete. The reactor is allowed to cool to 40° C., and isopropanol and other volatiles are removed under vacuum to yield a polymer polyol product having 39.1% solids. The particle size is 1.92 µm and the particle size span is 0.43. The viscosity is 5780 mPa·s at 25° C. and 100 sec$^{-1}$. The overall recipe is as follows:

TABLE 4

| | Weight-% | | |
| --- | --- | --- | --- |
| Ingredient | From Seed Dispersion | From Remainder of Recipe | Total |
| Polyol A | 1.655 | 54.46 | 56.115 |
| Macromer | 0.303 | 0 | 0.303 |

TABLE 4-continued

| Ingredient | Weight-% | | |
|---|---|---|---|
| | From Seed Dispersion | From Remainder of Recipe | Total |
| Seed Particles | 0.158 | 0 | 0.158 |
| Isopropanol | 0.283 | 6.25 | 6.533 |
| Styrene | 0.073 | 26.5 | 26.573 |
| Acrylonitrile | 0.024 | 10.05 | 10.074 |
| Free Radical Initiator | Negligible | 0.120 | 0.120 |
| Ratio, Monomer Mixture/Seed Particles | | | 232 |

D. Preparation of Flexible Polyurethane Foams

Viscoelastic polyurethane foams are made by mixing ingredients as listed in Table 5.

TABLE 5

| Ingredient | Parts By Weight | |
|---|---|---|
| | Inventive Foam | Comparative Foam C-A |
| Polyol B | 50 | 50 |
| Polyol C | 15 | 15 |
| Polyol D | 15 | 15 |
| Example 2 Polymer Polyol | 20 | 0 |
| Comparative Polymer Polyol[1] | 0 | 20 |
| Water | 2.1 | 2.1 |
| Surfactant | 0.8 | 0.8 |
| Catalyst Blend | 0.3 | 0.3 |
| Polymeric MDI | To 71.5 index | To 71.5 index |

[1]A 40% solids copolymer polyol in Polyol A, having a broad polymodal particle size distribution with particles ranging from 300 to 3000 nm in size with a major peak centered at about 500-600 nm.

In each case, all ingredients except the polymeric MDI are mixed together, followed by adding the polymeric MDI. The resulting reaction mixture is then poured into an open box and cured rise freely and cure to foam a viscoelastic foam. Foam properties are measured for each foam according to ASTM D3574, and are as indicated in Table 6.

TABLE 6

| Property | Comparative Foam | Inventive Foam |
|---|---|---|
| Airflow, cubic ft/min (L/s) | 1.65 (0.78) | 5.45 (2.57) |
| Density, lb/ft$^3$ (kg/m$^3$) | 3.0 (48) | 3.2 (51.2) |
| Compression Strength, 90% | 84.8 | 85.6 |
| Resiliency, % | 3 | 3.4 |
| Tear Strength, lb/in (N/m) | 0.77 (0.09) | 0.95 (0.11) |
| Tensile Strength, psi (kPa) | 5.7 (39) | 8.3 (57) |
| Elongation at break, % | 92 | 103 |
| Hysteresis, % | 82.2 | 84.6 |

As can be seen from the data in Table 6, the foam made using a polymer polyol of the invention has significantly greater airflow than the comparative foam, which is made using a polymer polyol with a wide particle size distribution and a large proportion of submicron particles. The advantage in airflow is obtained without significant losses in other properties which are generally equivalent between the two foams. Tensile, tear and elongation are all somewhat improved in the foam made with the polymer polyol of the invention.

What is claimed is:

1. A process for making a polymer polyol that contains styrene/acrylonitrile copolymer particles dispersed in a continuous phase that includes at least one polyol, comprising the steps of a) forming a seed dispersion containing 5 to 25 weight-% of an unsaturated macromer, 2.5-20 weight-% of styrene polymer or copolymer particles having a particle size of 50 to 500 nm, and 55-92.5 weight-% of a seed dispersion carrier polyol, the weight-percentages being based on the weight of the seed dispersion;

b) forming a carrier mixture containing the seed dispersion, a base polyol and a solvent, and dispersing a monomer mixture that includes at least 25 weight-% styrene and greater than 20 weight-% acrylonitrile, based on the weight of the monomer mixture, into the carrier mixture, wherein i) the amount of seed dispersion is sufficient to provide 0.025 to 0.35 weight percent seed particles and 0.1 to 0.75 weight percent of unsaturated macromer based on the combined weight of the carrier mixture and monomer mixture;

ii) the weight of the monomer mixture is at least 200 times the weight of the seed particles and when polymerized is sufficient to provide the polymer polyol with at least 30 weight-percent dispersed polymer particles and iii) the amount of the solvent is 6 to 20% of the combined weight of the carrier mixture and the monomer mixture c) polymerizing the dispersed monomer mixture to form polymer particles dispersed in the carrier mixture and then d) removing the solvent from the carrier mixture to form a polymer polyol product containing at least 30 weight-percent dispersed polymer particles, wherein the dispersed polymer particles have a particle size of 1 to 3 μm and a particle size span of less than 1.25.

2. The process of claim 1, wherein the solvent is one or more of an aromatic hydrocarbon, an aliphatic hydrocarbon or a monoalcohol.

3. The process of claim 2, wherein the solvent includes isopropanol.

4. The process of claim 2, wherein the amount of monomer mixture is 200 to 500 times the weight of the seed particles.

5. The process of claim 4, wherein the amount of seed dispersion is sufficient to provide 0.1 to 0.25 weight percent seed particles.

6. The process of claim 5, wherein the particle size of the seed particles is 75 to 150 nm.

7. The process of claim 5, wherein the seed dispersion is prepared by homopolymerizing or copolymerizing styrene in the presence of the seed dispersion carrier polyol, the macromer and 5 to 20 weight-% of a solvent.

8. The process of claim 5, wherein the polymer polyol product contains 35 to 55 weight percent dispersed polymer particles.

9. The process of claim 5, wherein the amount of solvent present in step b) is 6 to 16 weight-%, based on the combined weight of the carrier mixture and the monomer mixture.

10. The process of claim 5, wherein the base polyol is one or more polyether polyols having a hydroxyl equivalent weight of 400 to 2500.

11. The process of claim 2, wherein step c) is performed under sufficient pressure to prevent the solvent from volatilizing.

12. The process of claim 6 wherein the amount of seed dispersion is sufficient to provide 0.1 to 0.5 weight percent of unsaturated macromer based on the combined weight of the carrier mixture and monomer mixture.

* * * * *